United States Patent [19]

Robbins, III

[11] Patent Number: 4,979,628
[45] Date of Patent: Dec. 25, 1990

[54] CONTAINERS HAVING ONE OR MORE INTEGRAL ANNULAR BANDS OF INCREASED THICKNESS

[76] Inventor: Edward S. Robbins, III, 204 N. Court St., Florence, Ala. 35630

[21] Appl. No.: 372,761

[22] Filed: Jun. 29, 1989

Related U.S. Application Data

[63] Continuation-in-part of Ser. No. 288,237, Dec. 22, 1988, Pat. No. 4,930,644, and a continuation-in-part of Ser. No. 332,994, Apr. 4, 1989.

[51] Int. Cl.$^5$ .............................................. B65D 25/16
[52] U.S. Cl. ...................................... 215/1 C; 220/403
[58] Field of Search ...................... 215/1 R, 1 C, 11.3, 215/12.1; 220/462, 463, 85 B, 72, 83, 8, 403, , 470, 71; 222/213-215

[56] References Cited

U.S. PATENT DOCUMENTS

| Re. 32,379 | 3/1987 | Touzani | 215/1 C |
|---|---|---|---|
| 2,780,378 | 2/1957 | Romano | 215/1 C X |
| 2,916,058 | 12/1959 | Unthank | 220/85 B X |
| 3,039,648 | 6/1962 | Busch | 220/403 X |
| 3,163,544 | 12/1964 | Valyi | 220/404 X |
| 3,285,461 | 11/1966 | Santelli | 220/462 X |
| 3,297,194 | 1/1967 | Schaper et al. | 220/72 |
| 3,335,902 | 8/1967 | Javorik | 220/72 |
| 3,405,439 | 10/1968 | Uemura | 220/72 X |
| 3,565,280 | 2/1971 | Rausing | 220/462 X |
| 3,567,104 | 3/1971 | Arslanian et al. | 229/14 |
| 3,777,925 | 12/1973 | Eckholm | 220/404 X |
| 4,171,751 | 10/1979 | Schutz | 220/72 X |
| 4,174,051 | 11/1979 | Edwards et al. | 220/462 X |
| 4,257,527 | 3/1981 | Snyder et al. | 220/72 |
| 4,315,574 | 2/1982 | Fozny et al. | 220/72 |
| 4,560,085 | 12/1985 | Vom Hofe et al. | 220/404 X |
| 4,805,799 | 2/1989 | Robbins | 220/404 X |
| 4,925,055 | 5/1990 | Robbins et al. | 220/403 |
| 4,930,644 | 6/1990 | Robbins | 220/403 |

FOREIGN PATENT DOCUMENTS

| 965388 | 4/1975 | Canada | 215/11.3 |
|---|---|---|---|
| 1324373 | 3/1963 | France | 220/72 |
| 262992 | 10/1926 | United Kingdom | 220/72 |
| 974844 | 11/1964 | United Kingdom | 220/85 B |

Primary Examiner—Steven M. Pollard
Attorney, Agent, or Firm—Nixon & Vanderhye

[57] ABSTRACT

A container having a thin film flexible container body includes upper and lower portions defining a predetermined longitudinal extent of the container so as to establish an interior region adapted to hold selected contents. The container body integrally includes, between the upper and lower portions, at least one rigid annular band so as to impart lateral strength and stability to the container. Preferably, the upper and lower portions of the container body are rigid (i.e., self-supporting) and are unitarily formed with the thin film flexible container body together with the annular rigid bands thereof.

3 Claims, 4 Drawing Sheets

FIG. 1
FIG. 2
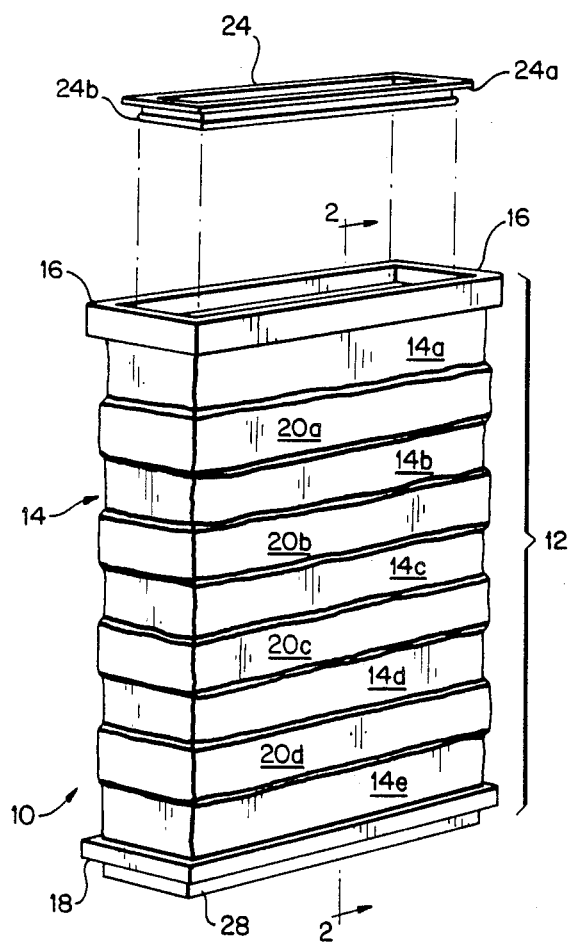
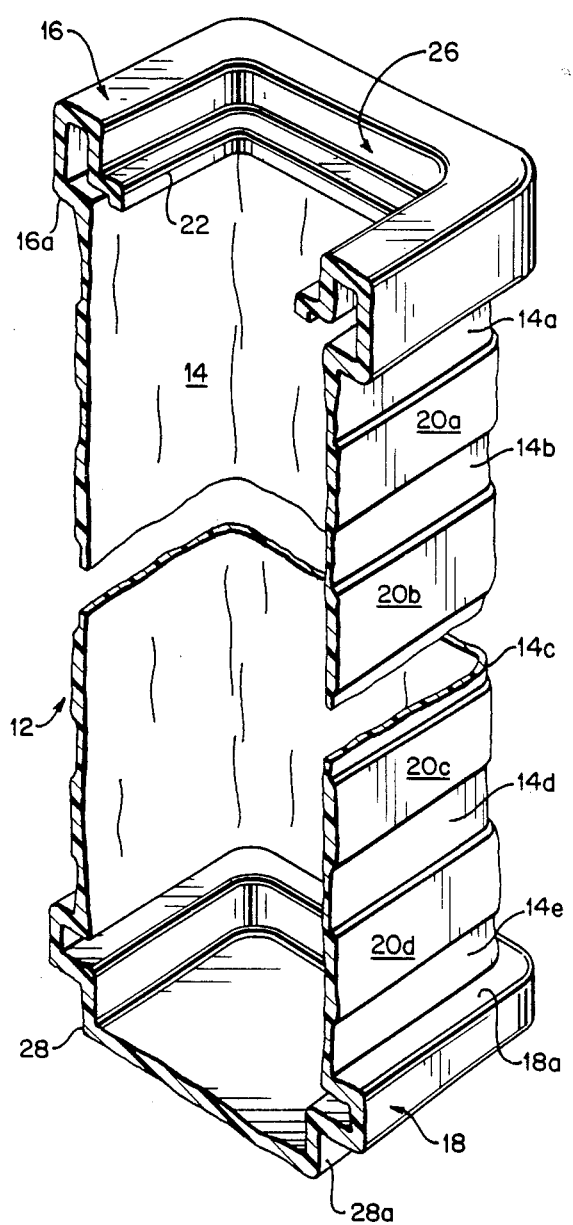

CONTAINERS HAVING ONE OR MORE INTEGRAL ANNULAR BANDS OF INCREASED THICKNESS

CROSS-REFERENCE TO RELATED APPLICATIONS

This application is a continuation-in-part of commonly owned and copending U.S. patent application Ser. No. 07/288,237 filed on Dec. 22, 1988, and entitled "Thin Film Container with Removable Lid and Related Process", and Ser. No. 07/332,994 filed on Apr. 4, 1989 and entitled "Containers Having Upper and Lower Sections of Different Thicknesses and Extrusion Blow-Molding Methods to Form the Same", the entire contents of each of these pending applications being expressly incorporated hereinto by reference.

FIELD OF INVENTION

This invention generally relates to containers adapted to holding a variety of solid and/or liquid materials. In preferred forms, the invention is embodied in containers having a "thin-film" flexible container body and one or more essentially rigid annular bands which impart lateral strength and stability to the container body.

BACKGROUND AND SUMMARY OF THE INVENTION

Containers of various sizes, shapes and materials are conventionally utilized in the foodstuffs industry to hold a variety of food products. Typically, the foodstuff packager will purchase and maintain in inventory bulk quantities of packaging materials. The packager will then usually fabricate the containers prior to filling them with particular foodstuffs. While some packaging materials (e.g., boxboard or other sheet-like material) may be transported in bulk to and stored by the foodstuff packager in an essentially flat (and hence space-saving) form, more rigid containers (i.e., containers which require greater structural strength than that afforded by containers formed of such sheet-like materials) may be required to be transported in an empty state to the food packager thereby wasting valuable shipping and warehouse space.

The containers according to the present invention are provided so as to solve many of the problems associated with conventional foodstuff packagings (although the containers of this invention may certainly be used commercially in non-foodstuffs industries). For example, the containers of this invention are provided with the means by which increased lateral strength and stability are imparted to the container body, while also allowing the container body, when empty, to be collapsed longitudinally to a more space-saving state. However, the present invention also includes containers having both lateral and longitudinal strength (and thus are essentially non-collapsible longitudinally) if these functions are more important for particular packaging applications than the space-saving collapsibility functions of other embodiments of this invention.

These advantageous aspects of the present invention are achieved by providing a "thin-film" container body (which is therefore collapsible longitudinally) having one or more integral (and more preferably unitary) annular bands of relatively thicker material (i.e., as compared to the thickness of the thin-film material of the container body) which impart lateral strength and stability to the otherwise low strength and instable thin film container body. When empty, the thin film container body of the present invention is therefore capable of collapsing to a more space-saving state, yet when filled with desired contents, the container body is laterally strengthened and stabilized by means of the annular bands.

If non-collapsing functions are desired, longitudinal and circumferentially spaced-apart rib elements may integrally be provided on the thin film container body. According to this embodiment of the present invention, reduced material costs are realized (i.e., since an otherwise thin film body may be provided) while yet achieving non-collapsibility functions (i.e., due to the longitudinal rib elements integrally provided on the thin film container body).

These aspects and advantages of the present invention will become more apparent after careful consideration is given to the following detailed description of the preferred exemplary embodiment thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is an exploded perspective view of one preferred container according to the present invention;

FIG. 2 is a perspective cross-sectional view of the container shown in FIG. 2 as taken along line 2—2 therein;

DETAILED DESCRIPTION OF THE PREFERRED EXEMPLARY EMBODIMENTS

Figure 3:
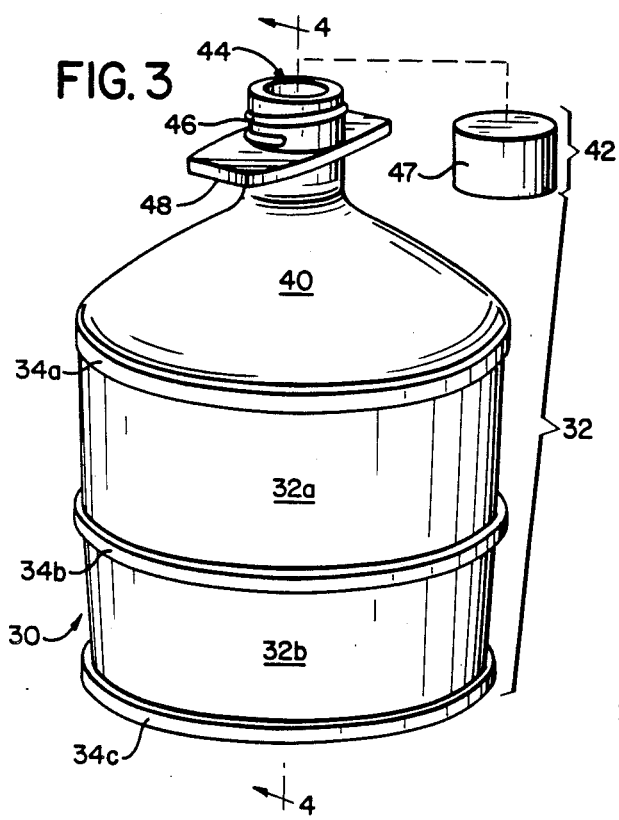
FIG. 3 is a perspective view of another container according to the present invention.

One preferred embodiment of a container 10 according to this invention is depicted in accompanying FIGS. 1 and 2. As is seen, the container 10 is principally formed of a container body 12 of predetermined (e.g., in dependance upon the size of container that is desired) longitudinal dimension. The container body 12 of the container 10 shown in FIGS. 1 and 2 is preferably in the form of a thin film flexible liner portion 14 integrally (and more preferably unitarily) connected to upper and lower essentially rigid annular portions 16 and 18, respectively.

The thin film liner portion 14 is sufficiently thin so that it is flexible. By the terms "flexible" and the like is meant that the structure has insufficient inherent mechanical strength to support its own weight—i.e., is non-self-supporting—and is therefore collapsible under its own weight. Conversely, by the terms "rigid" and the like is meant that the structure has sufficient inherent mechanical strength so as to be shape-retaining and capable of supporting its own weight—i.e., is self-supporting—and is therefore not collapsible under its own weight.

Between the rigid upper and lower portions 16, 18, respectively, the thin film liner 14 is integrally provided with several longitudinally separated essentially rigid annular bands 20a-20d. These annular rigid bands 20a-20d will establish therebetween a number of annular regions 14a-14e of the thin film liner portion 14. Thus, the thin film annular regions 14a-14e of thin film liner portion 14 retain their flexibility (i.e., non-self-supporting characteristics) whereas the annular bands 20a-20d are essentially rigid (and hence establish annular regions whereby self-supporting characteristics are imparted to the otherwise non-self-supporting thin film liner portion 14).

The rigid upper and lower portions 16 and 18, respectively, the flexible liner portion 14 and the annular essentially rigid bands 20a-20d are most preferably unitary with one another—that is, the container body 12 is most preferably a one-piece structure. In this regard, the container body 12 may be fabricated using the blow molding techniques disclosed more fully in the above-referenced copending U.S. Patent Applications, to which the reader's attention is directed.

The upper rigid portion 16 also includes an inwardly projecting annular lip 22 which defines an opening and thus permits access to the contents within the container 10 (i.e., within the flexible liner portion 14). A lid 24 may be provided so as to close this defined opening in the upper rigid portion 16. The lid 24 most preferably includes upper and lower annular fingers 24a and 24b, respectively, which are separated a sufficient dimension so as to receive a portion of the lip 22 therebetween. In such a manner, the lid 14 is frictionally coupled to the lip 22 of the upper rigid portion 16 to thereby allow it to be removed from and replaced onto the rigid portion 16 when desired.

It will further be observed, particularly in FIG. 2, that the lid 22 and rigid upper portion 16 define an interior recess 26 which is sized and configured to accept therewithin the downwardly protruding bottom wall 28 of a similar container 10. In this regard, the bottom wall 28 of container 10 defines a lateral side surface 28a (see FIG. 2) which is sized and configured so as to mate within the recess 26 of another similar container 10. In this manner, the containers 10 according to the embodiment of the present invention shown in FIGS. 1 and 2 may be stacked vertically.

The particular thickness and number of annular bands 20a-20d may vary in dependance upon several of factors, including the size of the container, the plastic material from which the container is fabricated, the material which the container is intended to hold, and the desired lateral strength and stability to be imparted to the thin film liner portion 14. For most end-use applications, however, the thickness of the annular bands 20a-20d will preferably (but not necessarily) be at least 1.25 times, and more preferably 1.5 times, the thickness of the thin film liner portion 10.

It will be observed that when the container 10 is filled the entire longitudinal extent of the liner portion 14 is realized. Moreover, the annular bands 20a-20d associated with the liner portion 14 will impart lateral strength and stability to the container 10 so as to minimize (if not eliminate) outward bulging. As the contents are consumed the annular flexible regions 14a-14e will then sequentially collapse to the extent permitted by the level of the contents within the container 10 at any given time thereby conserving shelf space. At the same time, the annular bands 20a-20d will remain essentially rigid (i.e.. will not collapse) and thereby maintain container's lateral strength and stability. In each case, the consumer may reclose the container via the lid 24 thereby preserving the "freshness" of the container's contents.

When empty, the container 10 will be capable of collapsing to the extent permitted by the annular flexible regions 14a-14e of the liner portion 14 thereby permitting such empty containers 10 to be shipped to, and stored by, a foodstuff packager, for example, in an extremely space-conserving state. Moreover, these containers 10 may be vertically stacked due to the recess 26 and protruding bottom wall 20 thereby providing further space-savings during shipment and storage.

The upper and lower rigid portions 16, 18 may also be provided with annular ledge surfaces 16a, 18a, respectively, so as to receive therebetween a rigid sleeve member (not shown) in the manner described more fully in the present applicant's copending U.S. application Ser. No. 372,760, filed on the same date as the present application and entitled "Sleeved Containers With Thin Film Lining", the entire content of which is expressly incorporated hereinto by reference. The sleeve member will therefore maintain the separation distance between the rigid upper and lower portions 16 and 18, respectively, so as to provide a composite container which has an interior film lining provided by means of the liner portion 14. In this form, the composite container will still benefit from the lateral strength and stability imparted thereto via the annular rigid bands 20a-20d associated with the thin film liner portion 14.

Figure 4:
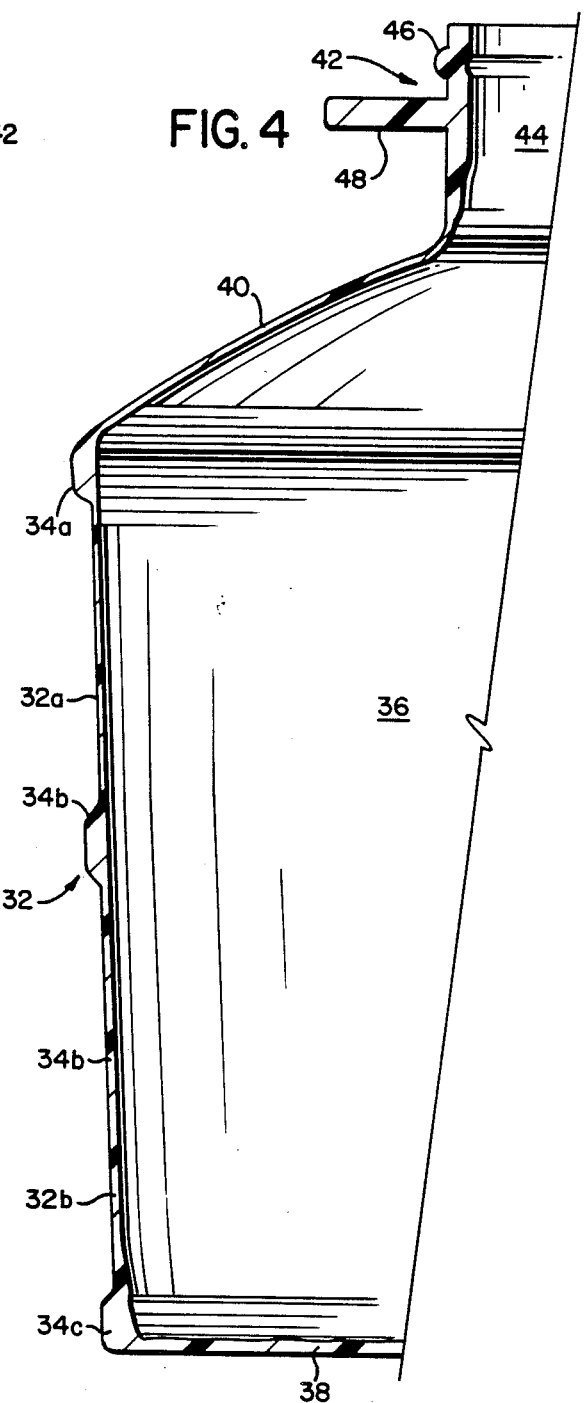
FIG. 4 is a partial cross-sectional elevational view of the container shown in FIG. 3 as taken along line 4—4 therein.

Another preferred embodiment of a container 30 according to the present invention is shown in accompanying FIGS. 3 and 4. As is seen, the container 30 is comprised of a thin film flexible container body 32 which integrally (and more preferably unitarily) includes a number of annular rigid bands 34a-34c so as to impart lateral strength and stability to the container body 32 in a manner similar to bands 20a-20d described above with reference to the container 10 shown in FIGS. 1-2. These annular rigid bands 34a-34c will also establish annular flexible regions 32a, 32b of the thin film body 32.

It will be observed that the uppermost annular band 34a will establish an upper part of a generally cylindrical interior cavity 36 (see FIG. 4) within the container 34, whereas the lowermost annular band 34c establishes a perimetrical base upon which the container body is supported. It will further be observed that the bottom wall 38 of the container body 32 may itself be thin film (and hence collapsible). However, a thickened (and hence rigid) bottom wall 38 could be provided if deemed desirable or necessary for any particular end-use application.

The container 30 shown in FIGS. 3-4 is particularly well suited for holding liquid beverages (e.g., milk, fruit juice, etcetera). In this regard, an upper tapered thin film wall 40 is most preferably conically shaped and thus extends upwardly from the uppermost annular rigid band 34a to a rigid neck region 42, this latter structure defining an opening 44 into the interior cavity 36 of the container 30. The rigid neck region 42 may be provided with suitable threads 46 so as to allow a cap 47 to be threadably coupled thereto and thus close the opening 44. Of course, other equivalent coupling means (such as friction or "snap-fit" structures) to these threads 46 may be employed with a suitably configured cap to perform the closure functions. Advantageously, the neck region 42 has an integral (and preferably unitary) transverse flange 48 which allows a user to more easily grasp and carry the container 30.

Figure 5:
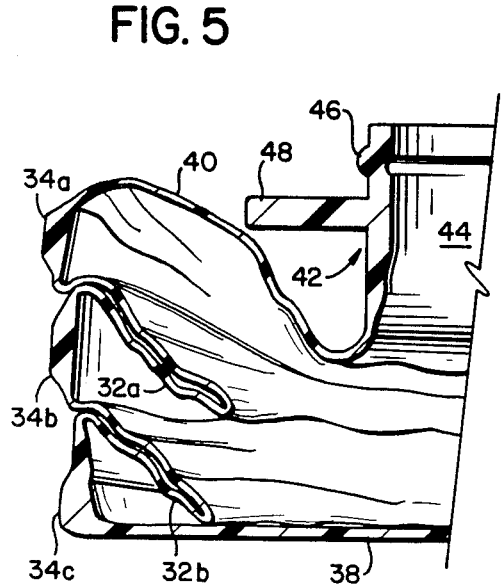
FIG. 5 is a partial cross-sectional view of the container shown in FIGS. 3-4 but depicted in a collapsed condition.

When empty, the thin film body 32 of container 30 will collapse under its own weight to a space-saving, essentially compressed state as shown in accompanying FIG. 5. As is seen, the thin film wall 40 and annular thin film regions 32a and 32b of the container body will collapse so that the annular rigid bands 32a–32c are positioned closely adjacent one another. Thus, the container 30 according to the present invention may be shipped and stored in this essentially compressed shape until it is desired to fill it, for example, with a suitable liquid beverage. When filled, however, the container will assume the shape shown in accompanying FIGS. 3–4 and will benefit from the lateral strength and stability provided by means of the annular rigid bands 34a–34c.

Figure 6:
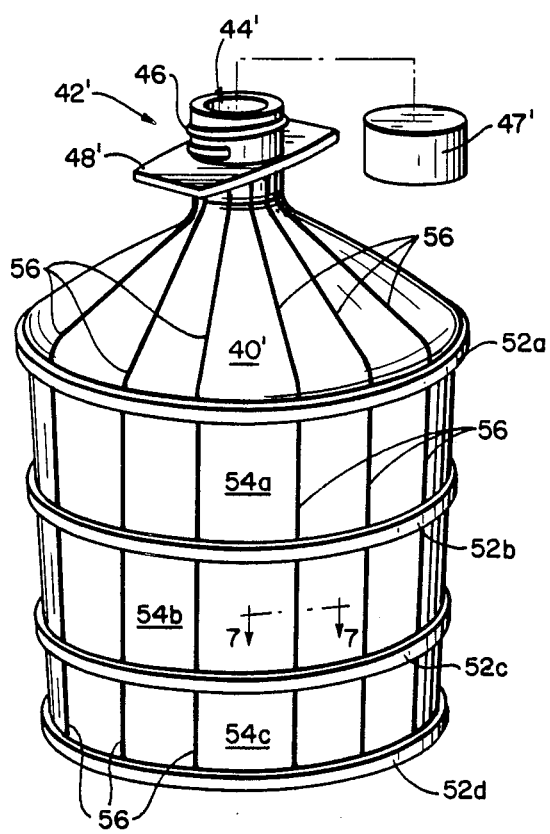
FIG. 6 is a perspective view of yet another embodiment of a container according to the present invention.

Another embodiment of a container 50 according to this invention is shown in accompanying FIG. 6. The container 50 is very similar to the container 30 described above with reference to FIGS. 3–5, with similar structures shown therein retaining the same reference numerals as employed in FIGS. 3–5 but with prime designations (') being added. One exception with regard to the container 50 as compared to the container 30 is that a pair of annular rigid bands 52b and 52c is positioned between the uppermost and lowermost annular rigid bands, 52a and 52d, respectively, so as to establish thin film annular regions 54a–54c.

In addition, the container 50 shown in FIG. 6 includes a number of longitudinal reinforcing ribs 54 circumferentially spaced apart from one another. These ribs 54 serve to prevent collapse of the otherwise flexible annular regions 54a–54c and the otherwise flexible tapered wall 40'. Thus, the container 50 shown in FIG. 6 may be used in those instances where non-collapsible functions are desirable or necessary, while yet retaining the beneficial lateral strength and stability provided by means of the annular bands 52a–52d.

Figure 7:
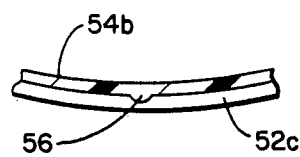
FIG. 7 is a detailed cross-sectional plan view as taken along line 7—7 in FIG. 6.

As shown in FIG. 7, the ribs 56 are preferably unitarily formed with the container 50. However, separate rib structures may be provided and then affixed longitudinally to the container (e.g., adhesively or via heat sealing), if desired.

The present invention also contemplates that the containers described above could be provided in combination with additional support structures so as, for example, to assist the consumer in dispensing the container's contents during use. Such a combination container 60 is shown in accompanying FIGS. 8 and 9.

Figures 8, 9:
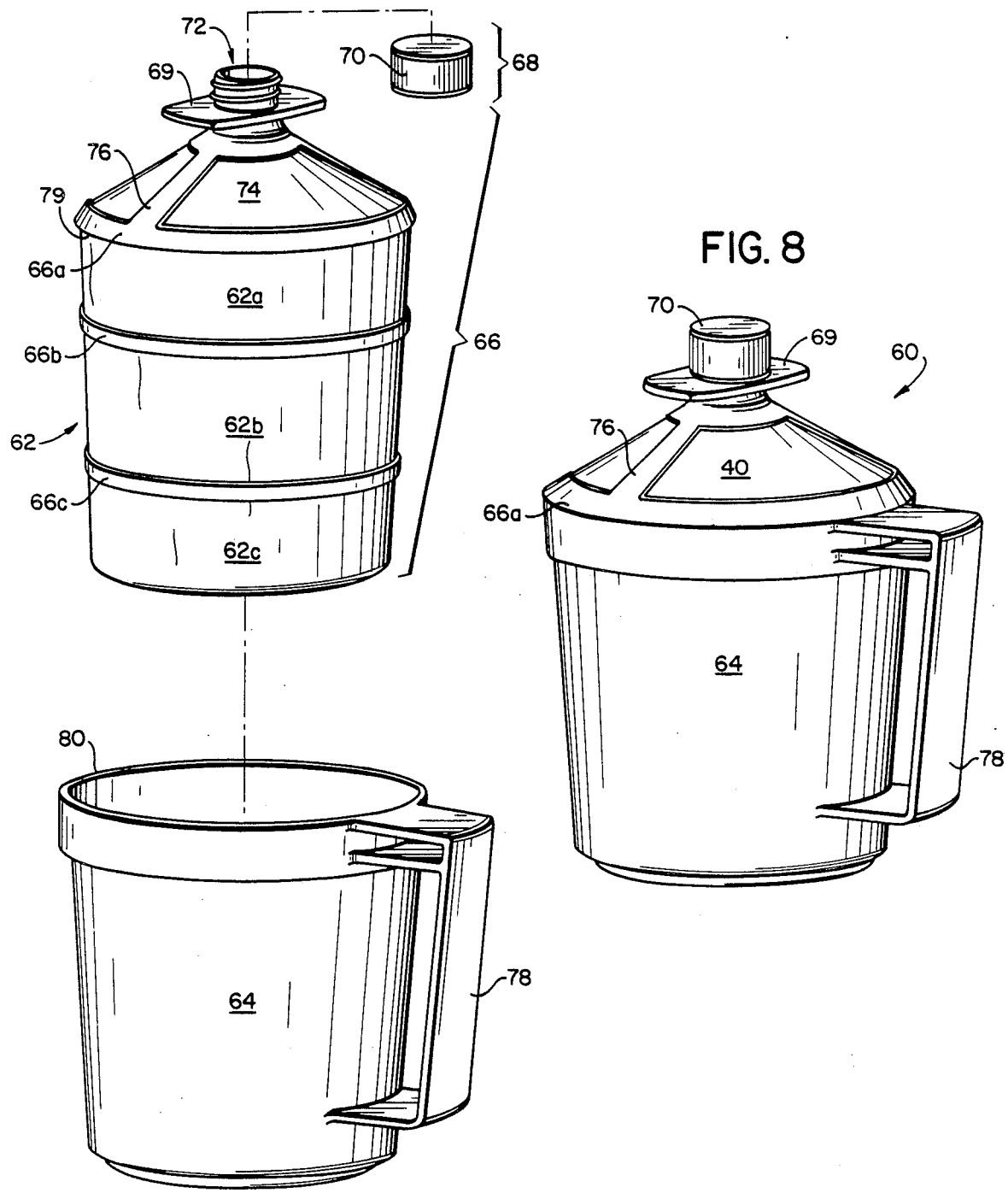
FIG. 8 is a perspective view of an embodiment of this invention which includes, in combination a collapsible container and a rigid holder therefor.
FIG. 9 is an exploded perspective view of the embodiment of this invention depicted in FIG. 8.

As is seen perhaps more clearly in FIG. 9, the combination container 60 includes a container portion 62 and a holder portion 64 adapted to removably receive, and provide additional support for, the container portion 62. In this regard, the container portion 62 is preferably similar to the collapsible container 32 discussed above in that it includes a thin film container body 66 and a rigid neck region 68. The neck region 68 preferably also has a transverse flange 69 which allows a user to more easily grasp and carry the container portion 62. A cap 70 may be provided to be threadably engaged on the neck region 68 so as to close the access opening 72 defined thereby.

The container body 66 is formed with several annular rigid bands 66a–66c of increased thickness (i.e., as compared to the thickness of the thin film forming the body 66) so as to impart lateral strength and stability to the container body 66. These annular rigid bands 66a–66c also establish flexible regions 62a–62c which are not self-supporting, and thus capable of collapsing, when the container portion 62 is empty.

The container portion 62 most preferably has an upper thin film, generally conically shaped upper wall 74 which extends from the uppermost one of annular bands 66a to the rigid neck region 68. Given the preference that the upper wall 74 of container 60 shown in FIGS. 8 and 9 not collapse, a number of generally longitudinally extending rigid strips 76 (only one such strip 76 being visible in FIGS. 8 and 9) are provided so as to rigidify the upper wall 74 in the longitudinal direction and hence impart self-supporting characteristics thereto.

The holder portion 64 is open-ended at its top and is sized and configured so as to receive the container portion 62 in nested relationship therewithin. Preferably, the holder portion 64 will include a handle member 78 integrally formed therewith to allow a user to more easily manipulate the combination container 60—that is when the container portion 62 is held within the holder portion 64.

The holder portion 64 is rigid (i.e. so as to provide longitudinal support for the container portion 62) and is preferably formed of a plastics material. Other materials, such as metal or boxboard, may be employed, however, provided that they provide the holder portion 64 with sufficient mechanical rigidity to allow it to structurally reinforce the container portion 62 as mentioned previously. The holder portion 64 need not be solid as shown, but instead could be formed of, e.g., a number of rigid panels extending the longitudinal extent of the holder.

Most preferably, the uppermost annular band 66a outwardly projects for the container body 66 a sufficient dimension to establish a surface 79 which bears against the upper edge 80 of the holder portion 64 when the former is received within the latter. Thus, the presence of such a surface 79 established by means of the uppermost annular band 66a will prevent upper wall 74 from moving into the interior of the holder portion 64 as the contents of the container portion 62 are progressively emptied during use. And, since the strips 76 impart self-supporting capabilities to the upper wall 74, it will retain its general conical shape even in the absence of liquid filling its interior volume. Thus, an aesthetically pleasing external appearance of the container 60 is maintained throughout its useful life.

Although the container portion 62 has been discussed above with reference to an embodiment thereof which is collapsible when empty (and thus provide space-savings during shipment and/or storage of the same when empty), a non-collapsible embodiment of this invention, e.g., as discussed above with reference to FIGS. 6–7, could likewise be utilized without departing from this invention.

In addition, a variety of alternative and equivalent arrangements for all embodiments of this invention may be envisioned. For example, rather that providing the rigid annular bands on the exterior of the thin film container body, they could equally be formed on the interior thereof, if desired.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container comprising;

a rigid holder portion, and a container portion removably received within said holder portion, wherein said container portion includes a thin film container body having an upper rigid region which defines an access opening into the container body, and at least one annular rigid band integrally associated with said container body, and wherein said container body includes a generally conically shaped upper wall which terminates at said rigid region, said upper wall being a thin film collapsible wall which is normally non-self-supporting, said upper wall integrally including at least one rigid strip radially extending between said thin film container body to said rigid region to impart self-supporting characteristics to said upper wall.

2. A container as in claim 1, wherein said holder portion includes an upper edge, and said at least one annular band extends outwardly from said container body to establish an annular surface which bears against said upper edge of said holder portion when said container portion is removably received therewithin.

3. A container as in claim 2, wherein said container body includes several annular rigid bands, and wherein an uppermost one of said annular bands extends outwardly from said container body and defines said annular surface.

* * * * *